United States Patent
Aihara et al.

(10) Patent No.: US 8,649,039 B2
(45) Date of Patent: Feb. 11, 2014

(54) IMAGE FORMING APPARATUS WITH PLURALITY OF CONTROL BOARDS CONNECTED TO EACH OTHER VIA A HIGH-SPEED BUS

(75) Inventors: Takashi Aihara, Saitama (JP); Hidemasa Morimoto, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1040 days.

(21) Appl. No.: 12/264,484

(22) Filed: Nov. 4, 2008

(65) Prior Publication Data

US 2009/0116062 A1     May 7, 2009

(30) Foreign Application Priority Data

Nov. 7, 2007   (JP) ................................. 2007-289207
Sep. 17, 2008  (JP) ................................. 2008-238114

(51) Int. Cl.
  *G06F 3/12*    (2006.01)
  *G03G 15/00*   (2006.01)
  *B41J 3/36*    (2006.01)

(52) U.S. Cl.
  USPC ............ 358/1.15; 358/1.1; 358/1.9; 358/502; 358/504; 399/12; 399/27; 399/109; 347/15; 347/104; 347/138

(58) Field of Classification Search
  None
  See application file for complete search history.

(56) References Cited

U.S. PATENT DOCUMENTS

| | | | | |
|---|---|---|---|---|
| 6,558,201 | B1* | 5/2003 | Begley et al. | 439/638 |
| 6,990,553 | B2* | 1/2006 | Nakayama et al. | 711/114 |
| 7,509,062 | B2* | 3/2009 | Kikuchi et al. | 399/24 |
| 2006/0146100 | A1* | 7/2006 | Dull et al. | 347/85 |
| 2008/0102663 | A1* | 5/2008 | Sakai | 439/108 |
| 2008/0228968 | A1 | 9/2008 | Aihara et al. | |
| 2009/0055567 | A1* | 2/2009 | Chen et al. | 710/302 |

FOREIGN PATENT DOCUMENTS

| | | |
|---|---|---|
| JP | 9-319174 | 12/1997 |
| JP | 2002-366257 | 12/2002 |
| JP | 2003-188551 | 7/2003 |
| JP | 2004-112410 | 4/2004 |
| JP | 2004-272646 | 9/2004 |
| JP | 2005-210653 | 8/2005 |

* cited by examiner

*Primary Examiner* — Steven Kau
(74) *Attorney, Agent, or Firm* — Oblon, Spivak, McClelland, Maier & Neustadt, L.L.P.

(57) ABSTRACT

A plurality of control boards can be connected to each other via a high-speed bus. An image forming unit performs an image forming process, which is housed in a casing. A slot is arranged on any one of a plurality of side surfaces perpendicular to a bottom surface of the casing, which is elongated in a direction perpendicular to the bottom surface and guides the control boards to inside of the casing. The control boards are connected in parallel to each other.

9 Claims, 5 Drawing Sheets

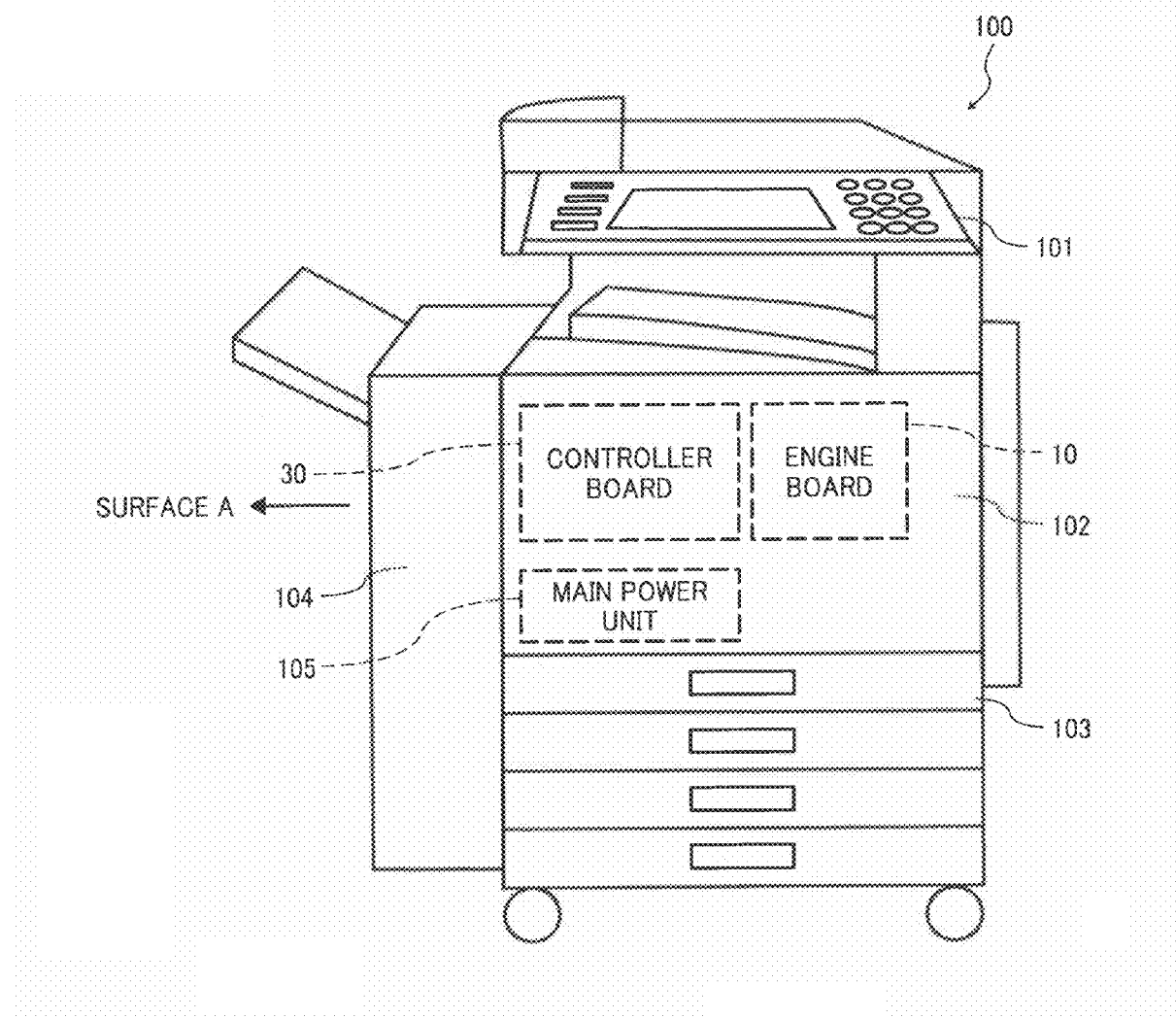

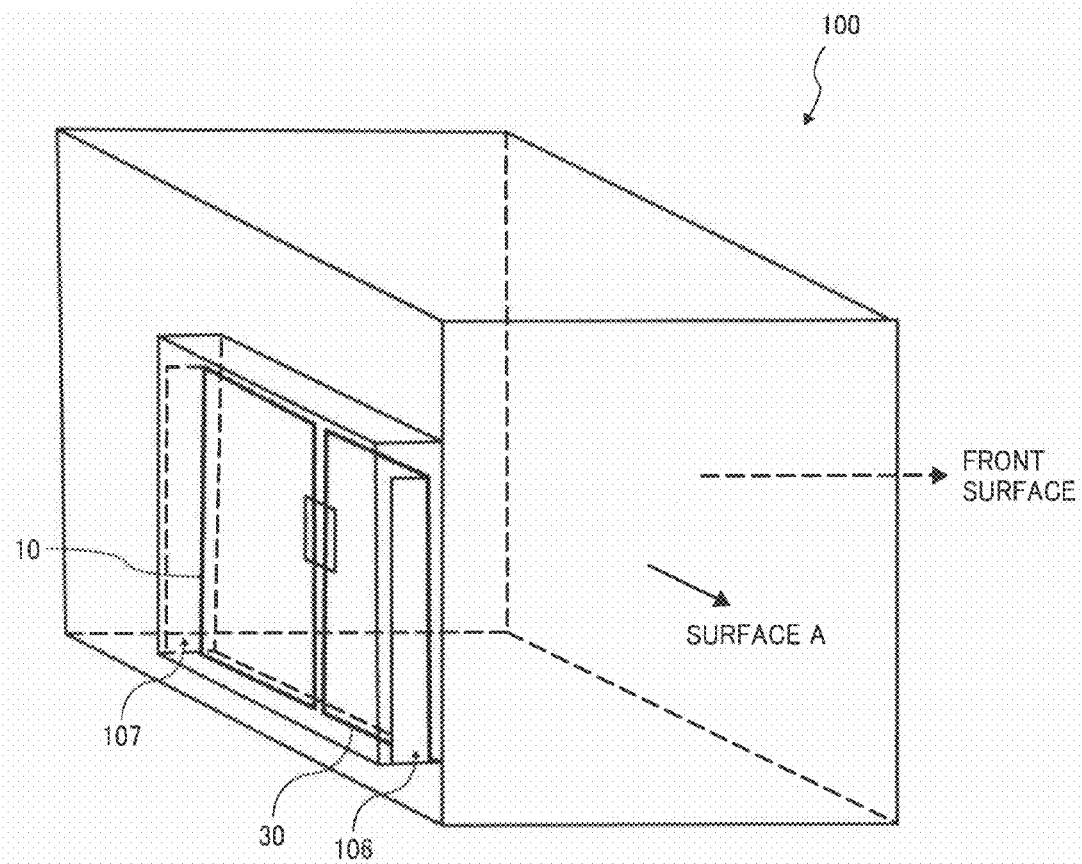

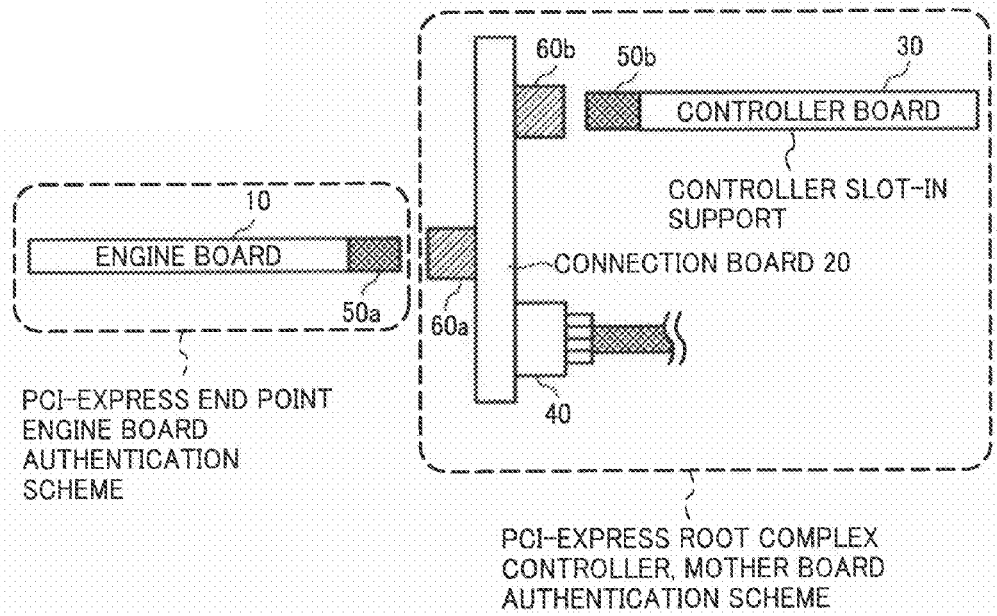
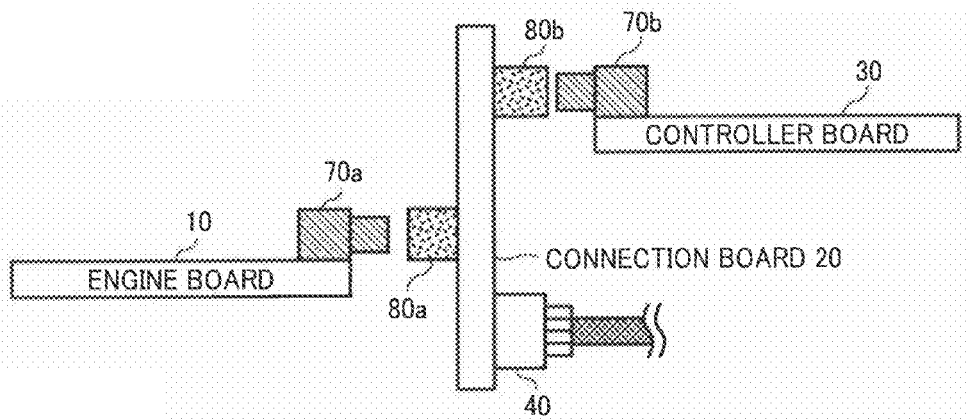

PCI-EXPRESS ROOT COMPLEX
CONTROLLER, MOTHER BOARD
AUTHENTICATION SCHEME

PCI-EXPRESS END POINT
ENGINE BOARD AUTHENTICATION
SCHEME

PCI-EXPRESS ROOT COMPLEX
CONTROLLER AUTHENTICATION
SCHEME

PCI-EXPRESS END POINT
ENGINE BOARD AUTHENTICATION
SCHEME

IMAGE FORMING APPARATUS WITH PLURALITY OF CONTROL BOARDS CONNECTED TO EACH OTHER VIA A HIGH-SPEED BUS

CROSS-REFERENCE TO RELATED APPLICATIONS

The present application claims priority to and incorporates by reference the entire contents of Japanese priority document 2007-289207 filed in Japan on Nov. 7, 2007 and Japanese priority document 2008-238114 filed in Japan on Sep. 17, 2008.

BACKGROUND OF THE INVENTION

1. Field of the Invention

The present invention relates to an image forming apparatus having a plurality of control boards connected to each other via a high-speed serial bus.

2. Description of the Related Art

A conventional computer includes an expansion slot through which an expansion card such as an add-in card (function expansion card) can be connected. The add-in card is, for example, a network card or a video card containing a predetermined computer program. The video card generally allows rendering of three-dimensional (3D) graphics at a high speed. The add-in card is inserted through the expansion slot and is connected to the computer, so that functions of the computer can be expanded.

Various data transmission systems, such as a peripheral component interconnect (PCI) bus, an industrial standard architecture (ISA) bus, and an accelerated graphics port (AGP) bus, are used for the expansion slot.

The PCI bus is a 32-bit interface proposed by Intel Corporation in 1992, and is one of architectures for the computer. Various devices such as a modem card and a video card can be used through the PCI bus.

Japanese Patent Application Laid-open No. 2002-366257 discloses a technology for improving expandability of a PCI board by arranging a replaceable PCI bracket in the PCI board when connecting the PCI board to a PCI connector.

Japanese Patent Application Laid-open No. 2004-272646 discloses a technology for improving a degree of freedom in an arrangement position of a PCI board that is connected to a PCI connector on a mother board by forming a first connector terminal on an edge of the PCI board and a second connector terminal at a predetermined position on the PCI board.

In recent years, a PCI-Express bus that is a high-speed serial bus has been standardized as a next-generation bus to transmit large-volume data, such as 3D graphics or a moving image, with high quality and at a high speed.

The PCI-Express bus can perform data transmission at a high speed with serial signals by bundling a plurality of lanes (transmission paths), and can perform a full duplex communication at 2.5 Gbps in a unidirectional communication and at 5.0 Gbps in a bidirectional communication.

Japanese Patent Application Laid-open No. 2005-210653 discloses a technology for, in a system configuration including a plurality of memory controller functions, setting the number of lanes of each PCI-Express bus depending on a size of image data to be transmitted via a data transmission path thereby effectively using the PCI-Express bus.

Because a specification of the PCI-Express is mainly for a personal computer (PC), it allows an expansion of functions in the form of add-in card with a hypothesis that a control board is arranged perpendicular to the mother board.

If an image forming apparatus has a configuration such that a plurality of control boards can be connected to each other via the PCI-Express bus, it is necessary to arrange a controller board corresponding to the add-in card perpendicular to an engine board in the image forming apparatus. For this arrangement, the engine board needs to be arranged in parallel to the bottom surface of a casing of the image forming apparatus, and the controller board needs to be inserted from the top (or the bottom) of the image forming apparatus so that the controller board is arranged perpendicular to the engine board.

However, it is often difficult to arrange the control boards perpendicular to each other in the image forming apparatus because of the reasons peculiar to the image forming apparatus as described below:

(1) an engine occupies most areas of a main body of the image forming apparatus;

(2) it is a priority to secure a space for removing a recording medium when the recording medium is jammed in the image forming apparatus;

(3) a scanner unit is usually mounted in an upper portion of the casing of the image forming apparatus;

(4) it is necessary to secure spaces for feeding and discharging a recording medium; and (5) the control boards can be easily affected by heat generated by a fixing roller in the image forming apparatus.

In the field of portable PCs, the Mini PCI-Express has been put into practical use, which includes a card edge to be mounted from a side surface (a surface perpendicular to the bottom surface of the casing) of the casing whereby the control board is prevented from being arranged in a direction perpendicular to the bottom surface of the casing. However, because the specification of the Mini PCI-Express allows a limited channel to only one lane, it is difficult to apply the Mini PCI-Express to the image forming apparatus.

Moreover, in the image forming apparatus in which the control boards can be connected to each other via the PCI-Express bus, a dedicated device compatible with ultrahigh-speed serial transmission needs to be arranged as a detector for waveform timing that is necessary to assure the quality. Because a specification of the dedicated device is for a PC, it is difficult to perform an electric connection authentication appropriate to the image forming apparatus.

SUMMARY OF THE INVENTION

It is an object of the present invention to at least partially solve the problems in the conventional technology.

According to one aspect of the present invention, there is provided an image forming apparatus including a plurality of control boards that can be connected to each other via a high-speed bus; an image forming unit that performs an image forming process; a casing that houses the image forming unit; and a slot that is arranged on any one of a plurality of side surfaces perpendicular to a bottom surface of the casing, which is elongated in a direction perpendicular to the bottom surface and guides the control boards to inside of the casing. The control boards are connected in parallel to each other.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a front view of an image forming apparatus according to a first embodiment of the present invention;

FIG. 2 is a perspective view of the image forming apparatus;

FIG. 3 is a schematic diagram for explaining arrangement of an engine board and a controller board in the image forming apparatus according to the first embodiment;

FIG. 4 is a schematic diagram for explaining arrangement of the engine board and the controller board according to a second embodiment of the present invention;

DETAILED DESCRIPTION OF THE PREFERRED EMBODIMENTS

Figure 5:
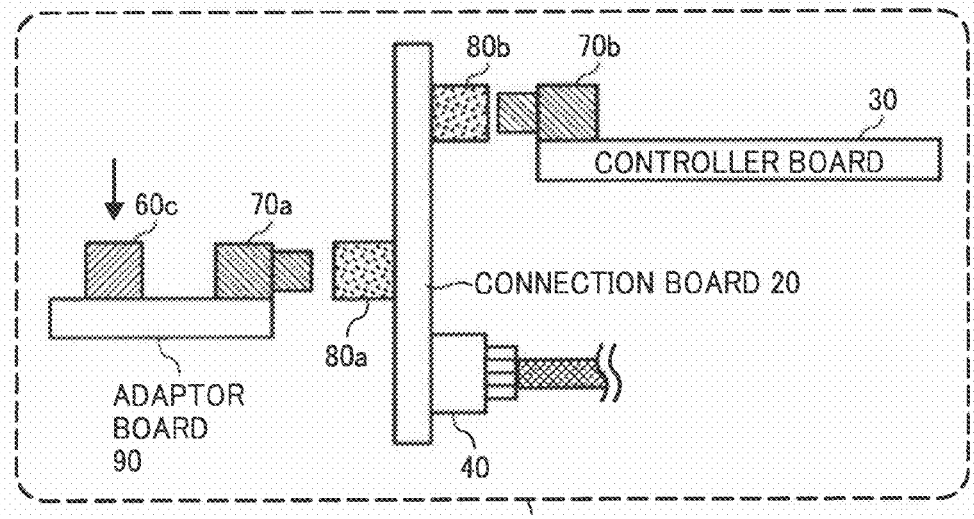
FIG. 5 is a schematic diagram for explaining arrangement of the controller board and an adaptor board according to a third embodiment of the present invention.

Exemplary embodiments of the present invention are explained in detail below with reference to the accompanying drawings.

FIG. 1 is a front view of an image forming apparatus 100 according to a first embodiment of the present invention. The image forming apparatus 100 includes an operation unit 101, a main body unit 102, a feeding unit 103, and a discharging unit 104.

A controller board 30, an engine board 10, and a main power unit 105 are mounted in the main body unit 102. The controller board 30 is a control board that controls an image forming process. The engine board 10 is a control board that controls a printer engine (not shown) and a scanner engine (not shown), and acquires image data from the scanner engine. Electric power is supplied to the controller board 30 and the engine board 10 from the main power unit 105.

FIG. 2 is a perspective view of the image forming apparatus 100. The engine board 10 and the controller board 30 are arranged in parallel to each other in the main body unit 102. The controller board 30 is inserted from an external slot 106 that is arranged on one side surface of a casing of the image forming apparatus 100, so that the controller board 30 is mounted in the main body unit 102. The engine board 10 is inserted from an external slot 107 that is arranged on the other side surface of the casing of the image forming apparatus 100, so that the engine board 10 is mounted in the main body unit 102.

The external slots 106 and 107 are arranged on the side surfaces that are perpendicular to the bottom surface of the casing. The external slots 106 and 107 guide the controller board 30 and the engine board 10, respectively, to inside of the casing.

FIG. 3 is a schematic diagram for explaining arrangement of the engine board 10 and the controller board 30 in the image forming apparatus 100. The image forming apparatus 100 includes the engine board 10, the controller board 30, a connection board 20, and a power unit 40. The engine board 10 and the controller board 30 can be connected to each other via the PCI-Express bus. FIGS. 3 to 9 that will be described below are overhead views from the bottom surface (the surface to be in contact with the ground) of the image forming apparatus 100, and each of the engine board 10 and the controller board 30 is arranged perpendicular to the bottom surface of the image forming apparatus 100.

The engine board 10 is inserted from the external slot 107 by the user, so that the engine board 10 is electrically connected to the connection board 20. The engine board 10 is connected to an image data acquiring unit (not shown), such as the scanner engine.

An edge portion 50a with a card electromechanical (CEM) specification is arranged on a side surface of the engine board 10. The edge portion 50a is electrically connected to a connector 60a arranged on the connection board 20, so that data, such as image data, can be sent via the connection board 20.

The engine board 10 functions as a PCI-Express end point having a configuration space. A specific area is provided for each device in the configuration space, and specific base address information is stored in the specific area for each device.

The base address information includes identification information specific to the device of the image forming apparatus 100 and class (attribute information) to which the device belongs to. By referring to the base address information, the engine board 10 can confirm whether each device is present in an environment or acquire an address of a device to which data is to be sent.

The connection board 20 is fixedly mounted in a direction perpendicular to the bottom surface of the casing in the image forming apparatus 100, and the connector 60a and a connector 60b with the CEM specification are arranged on both side surfaces of the connection board 20, so that the connection board 20 can be connected to the control boards. The connection board 20 is connected to the engine board 10 and the controller board 30 that are guided from the sides of the image forming apparatus 100.

The connector 60a is electrically connected to the edge portion 50a, and the connector 60b is electrically connected to an edge portion 50b arranged on a side surface of the controller board 30.

The connection board 20 is connected to the power unit 40, so that the connection board 20 receives the power supply from the power unit 40. The connection board 20 distributes the received power to the engine board 10 and the controller board 30.

In a conventional configuration in which the power is supplied through the control board (the engine board 10 or the controller board 30), because a terminal is connected in an exposed manner, there can occur a short by contact. In the first embodiment, the power is supplied from the power unit 40 through the connection board 20, so that it is possible to prevent the short by contact, and to provide the configuration with improved safety.

The controller board 30 is inserted from the external slot 106 by the user, so that the controller board 30 is electrically connected to the connection board 20. The edge portion 50b with the CEM specification is arranged on the side surface of the controller board 30. The edge portion 50b is electrically connected to the connector 60b. Thus, the connection board 20 is fixedly mounted in the direction perpendicular to the bottom surface of the casing, and the engine board 10 and the controller board 30 are arranged to face the connection board 20 and are guided to inside of the casing from the external slot 107 and the external slot 106. The engine board 10 and the controller board 30 are then connected in parallel to each other inside the casing.

The controller board 30 functions as the add-in card containing a computer program for expanding a predetermined function. After the controller board 30 is connected to the connection board 20, a function expansion program is sent from the controller board 30 to a central processing unit (CPU) (not shown) or a memory (not shown).

The controller board 30 and the engine board 10 are guided to inside of the casing by the external slots 106 and 107 and a guide rail (not shown), so that the controller board 30 and the engine board 10 are arranged in parallel to each other and are horizontally fixed in a stable position without wobbling.

The external slots 106 and 107 are arranged on the side surfaces of the casing of the image forming apparatus 100 (the surfaces perpendicular to the bottom surface of the image forming apparatus 100) in the direction perpendicular to the bottom surface of the casing, and the controller board 30 and the engine board 10 are inserted from the external slot 106 and the external slot 107, respectively, by the user, so that the controller board 30 and the engine board 10 are connected to each other.

Although one control board is inserted from one external slot and two external slots are arranged in the image forming apparatus 100 according to the first embodiment, the number of the external slots is not limited to two, and the external slots can be arranged at a plurality of positions to connect the control boards.

As described above, in the image forming apparatus 100 in which the engine board 10 and the controller board 30 can be connected via the PCI-Express bus, the connection board 20 is fixedly mounted in the direction perpendicular to the bottom surface of the casing, and the engine board 10 and the controller board 30 are arranged to face the connection board 20 and are guided to inside of the casing from the external slot 106 and the external slot 107, respectively, whereby the engine board 10 and the controller board 30 are arranged in parallel to each other in the casing. Thus, it is possible to prevent the engine board 10 and the controller board 30 from being arranged perpendicular to each other. As a result, it is possible to secure a space for arranging the engine board 10 and the controller board 30 in the image forming apparatus 100, and to prevent the engine board 10 and the controller board 30 from being affected by heat generated by a fixing roller (not shown). Furthermore, after the engine board 10 and the controller board 30 are connected to each other, the image data can be sent between the engine board 10 and the controller board 30 via the PCI-Express bus, and the image forming apparatus 100 can form the image data on a recording medium.

Moreover, as described above, the controller board 30 and the engine board 10 are arranged in parallel to each other via the connection board 20. Therefore, when the power is supplied through the control board (the card edge), which can cause a safety problem such as the short by contact if the terminal is connected in an exposed manner, it is possible to reduce such a trouble in the controller board 30, and to improve the safety.

FIG. 4 is a schematic diagram for explaining arrangement of the engine board 10 and the controller board 30 according to a second embodiment of the present invention. In each of the embodiments described below, the same part as that of the first embodiment is indicated by the same reference numeral, and a different part is indicated by a different reference numeral. The description on the same part will be omitted as appropriate.

A general-purpose male connector 70a is arranged on the upper end surface of the engine board 10. The male connector 70a is electrically connected to a general-purpose female connector 80a arranged on the side surface of the connection board 20.

The connection board 20 is fixedly mounted in the image forming apparatus 100 in the direction perpendicular to the bottom surface of the casing. The female connector 80a and a general-purpose female connector 80b are arranged on both side surfaces of the connection board 20, and the connection board 20 is connected to the engine board 10 and the controller board 30 guided from the sides of the casing. The female connector 80a is electrically connected to the male connector 70a, and the female connector 80b is electrically connected to a general-purpose male connector 70b arranged on the upper surface of the controller board 30.

As described above, in the second embodiment, it is not necessary to perform processing for the edge portions 50a and 50b as in the first embodiment, and therefore it is possible to reduce the costs by using the general-purpose connectors for connecting the control boards.

FIG. 5 is a schematic diagram for explaining arrangement of the controller board 30 and an adaptor board 90 according to a third embodiment of the present invention. The adaptor board 90 is a dedicated device compatible with ultrahigh-speed serial transmission and is used in the PCI-Express bus as a detector for waveform timing that is necessary to assure the quality. The adaptor board 90 can perform an electric connection authentication (compliance test) whether the electric connection to the adaptor board 90 is established.

Authentication information by which the engine board 10, the controller board 30, and the connection board 20 can be identified is stored in the adaptor board 90 in advance. When the engine board 10, the controller board 30, or the connection board 20 is connected to the adaptor board 90, the adaptor board 90 can perform an authentication process on the connected board by acquiring the authentication information from the connected board and determining whether the acquired authentication information matches the authentication information stored in the adaptor board 90.

A connector 60c with the CEM specification and the male connector 70a are arranged on the upper surface of the adaptor board 90. The female connector 80a is connected to the male connector 70a.

As described above, in the third embodiment, the adaptor board 90, the connection board 20, and the controller board 30 function as a PCI-Express root complex, and there is provided the adaptor board 90 that performs the electric connection authentication when the connection board 20 and a general-purpose board are connected. Thus, it is possible to perform the quality assurance by the controller board 30 in an appropriate manner.

Figure 6:
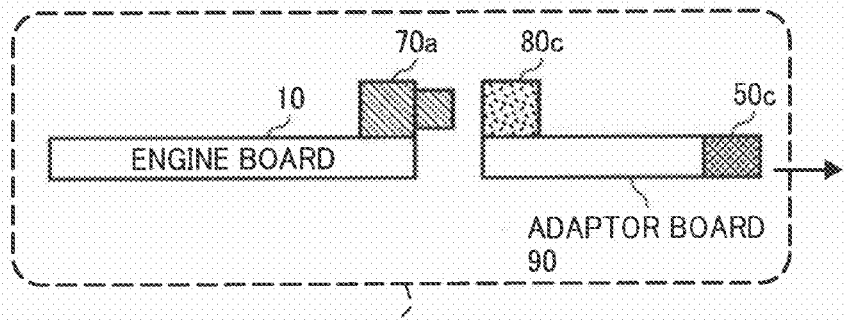
FIG. 6 is a schematic diagram for explaining arrangement of the engine board and the adaptor board according to a fourth embodiment of the present invention.

FIG. 6 is a schematic diagram for explaining arrangement of the engine board 10 and the adaptor board 90 according to a fourth embodiment of the present invention. The male connector 70a is arranged on the upper end surface of the engine board 10. A general-purpose female connector 80c is arranged on the upper end surface of the adaptor board 90, and an edge portion 50c with the CEM specification is arranged on the side of the adaptor board 90.

In the fourth embodiment, the adaptor board 90 and the engine board 10 function as a PCI-Express end point, and there is provided the adaptor board 90 that performs the electric connection authentication when the connection board 20 and a general-purpose board are connected. Thus, it is possible to perform the quality assurance by the engine board 10 in an appropriate manner.

Furthermore, in the fourth embodiment, because the costs for processing the edge of the controller board 30 (the add-in card) is expensive, the engine board 10 and the controller board 30 are connected in parallel to each other by using the connectors 70a and 80c with the PCI-Express specification.

Thus, it is possible to eliminate the use of the connection board which causes the increase in the costs, and to reduce the cost of manufacturing.

Figure 7:
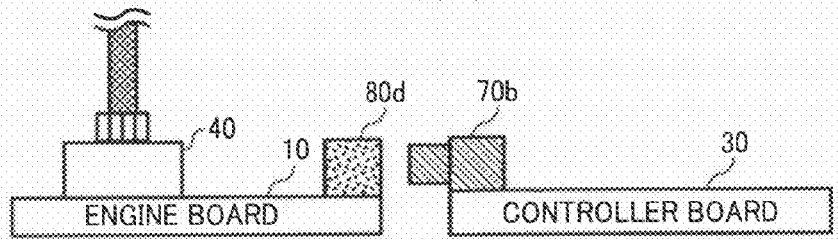
FIG. 7 is a schematic diagram for explaining arrangement of the engine board and the controller board according to a fifth embodiment of the present invention.

FIG. 7 is a schematic diagram for explaining arrangement of the engine board 10 and the controller board 30 according to a fifth embodiment of the present invention. The power unit 40 is arranged on the upper surface of the engine board 10, and a general-purpose female connector 80d is arranged on the upper end surface of the engine board 10. The female connector 80d is connected to the male connector 70b.

As described above, in the fifth embodiment, the engine board 10 and the controller board 30 can be connected by the connectors 80d and 70b without using the connection board 20, so that it is possible to reduce the costs of manufacturing.

Figure 8:
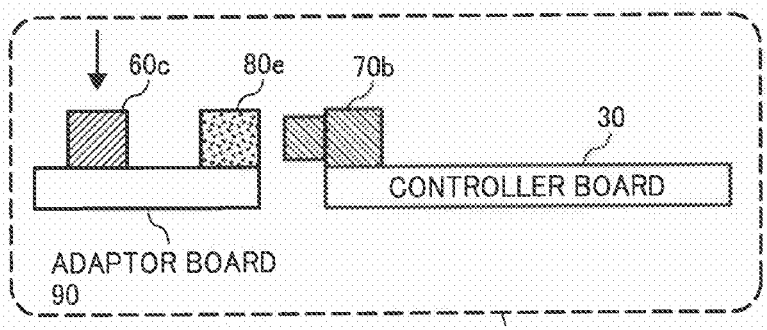
FIG. 8 is a schematic diagram for explaining arrangement of the adaptor board and the controller board according to a sixth embodiment of the present invention.

FIG. 8 is a schematic diagram for explaining arrangement of the adaptor board 90 and the controller board 30 according to a sixth embodiment of the present invention. The connector 60c and a general-purpose female connector 80e are arranged on the upper surface of the adaptor board 90. The female connector 80e is connected to the male connector 70b.

The adaptor board 90 and the controller board 30 can function as the PCI-Express root complex.

Thus, there is provided the adaptor board 90 that performs the electric connection authentication, and the control boards are connected by the connectors 70b and 80e without using the connection board 20, so that it is possible to perform the quality assurance by the controller board 30, and to reduce the cost of manufacturing.

Figure 9:
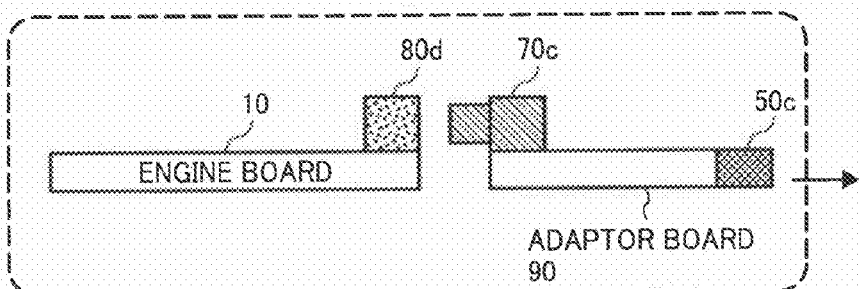
FIG. 9 is a schematic diagram for explaining arrangement of the engine board and the adaptor board according to a seventh embodiment of the present invention.

FIG. 9 is a schematic diagram for explaining arrangement of the engine board 10 and the adaptor board 90 according to a seventh embodiment of the present invention. The female connector 80d is arranged on the upper end surface of the engine board 10, and the female connector 80d is connected to a general-purpose male connector 70c arranged on the upper end surface of the adaptor board 90. The adaptor board 90 and the engine board 10 can function as the PCI-Express end point.

Thus, there is provided the adaptor board 90 that performs the electric connection authentication, and the control boards are connected by the connectors 70c and 80d without using the connection board 20, so that it is possible to perform the quality assurance by the engine board 10, and to reduce the cost of manufacturing.

The present invention is not limited to the above embodiments, but the present invention can be embodied by modifying the components without departing from the scope of the present invention in an implementation phase. Furthermore, it is possible to make various inventions by combining the components described in the above embodiments as appropriate. Some of the components can be omitted from the components described in the embodiments. Moreover, the components in the different embodiments can be combined as appropriate.

According to an aspect of the present invention, it is possible to secure a space for arranging the control boards, and to reduce the effect of the heat on the control boards.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a plurality of control boards connected to each other via a high-speed bus;
an image forming unit that performs an image forming process;
a casing that houses the image forming unit; and
an external slot that is arranged on any one of a plurality of side surfaces perpendicular to a bottom surface of the casing, which is elongated in a direction perpendicular to the bottom surface and guides the control boards from outside of the casing to inside of the casing,
wherein the control boards are connected to the side surface of the casing on which the external slot is arranged in parallel to each other and without overlapping each other with respect to the side surface of the casing, and the external slot includes a first external slot and a second external slot arranged to oppose each other, where the control boards are inserted from opposite directions of each other.

2. The image forming apparatus according to claim 1, wherein the control boards include:
an engine board that controls the image forming unit; and
a controller board that controls the image forming process.

3. The image forming apparatus according to claim 2, further comprising:
an intermediate connection board through which the engine board and the controller board are connected to each other.

4. The image forming apparatus according to claim 3, wherein the intermediate connection board includes a power unit that supplies electric power to the control boards.

5. The image forming apparatus according to claim 1, wherein the control boards include a general-purpose connector through which the control boards are connected to each other.

6. The image forming apparatus according to claim 2, further comprising:
an authenticating unit that performs an electric connection authentication on the high-speed bus, wherein
the authenticating unit performs an authentication of the controller board.

7. The image forming apparatus according to claim 2, further comprising:
an authenticating unit that performs an electric connection authentication on the high-speed bus, wherein
the authenticating unit performs an authentication of the engine board.

8. The image forming apparatus according to claim 1, wherein the high-speed bus is a peripheral component interconnect express bus.

9. The image forming apparatus according to claim 1, wherein the external slot is configured to protrude outside from the side surface.

* * * * *